United States Patent [19]

Engelhard

[11] 4,222,605
[45] Sep. 16, 1980

[54] WINDOW BOOT

[76] Inventor: Thomas E. Engelhard, 4325 Colfax Ave. South, Minneapolis, Minn. 55409

[21] Appl. No.: 921,276

[22] Filed: Jul. 3, 1978

Related U.S. Application Data

[63] Continuation-in-part of Ser. No. 738,313, Nov. 2, 1976, Pat. No. 4,114,943.

[51] Int. Cl.³ .............................................. B60P 3/32
[52] U.S. Cl. ..................................... 296/166; 105/18; 52/393
[58] Field of Search ............... 296/23 MC, 23 R, 172, 296/176, 166; 403/51; 105/18; 285/201; 277/25; 52/208, 400, 393

[56] References Cited

U.S. PATENT DOCUMENTS

| | | | |
|---|---|---|---|
| 3,404,909 | 10/1968 | Gottschald | 403/51 |
| 3,586,119 | 6/1971 | Chuchua | 296/23 MC |
| 3,638,991 | 2/1972 | Hathaway | 296/23 MC |
| 3,837,700 | 9/1974 | Van Slyke | 296/23 MC |
| 3,853,348 | 12/1974 | Bjork | 296/23 MC |
| 4,095,836 | 6/1978 | Pettit | 296/166 |
| 4,183,573 | 1/1980 | DeRidder | 296/166 |

Primary Examiner—John J. Love
Assistant Examiner—Norman L. Stack
Attorney, Agent, or Firm—Norman P. Friederichs

[57] ABSTRACT

A boot is provided which includes a resiliently deformable frame shaped to the respective contours of the rear window aperture of the truck cab and front window aperture in the forward wall of the camper. The opposite end walls of the boot frame terminate in respective continuous thickened lips which respectively snap-fit into corresponding channels provided in the cab and camper window frame. The thickened lips each include a flange-like projection which when the boot is installed provides a trough for draining away water.

7 Claims, 5 Drawing Figures

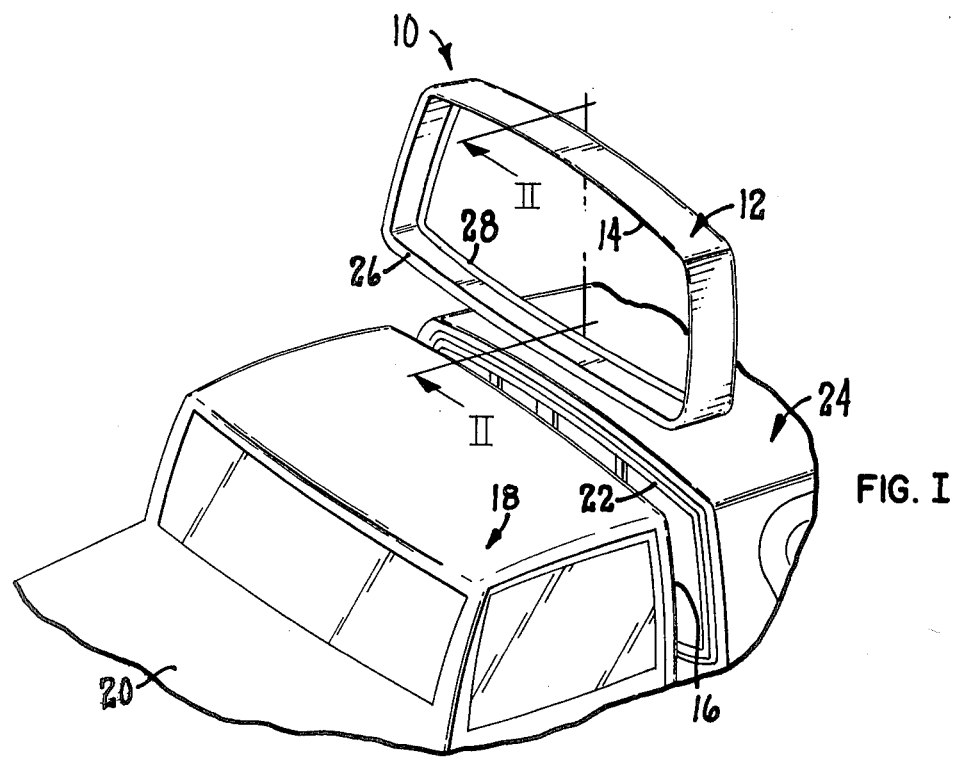
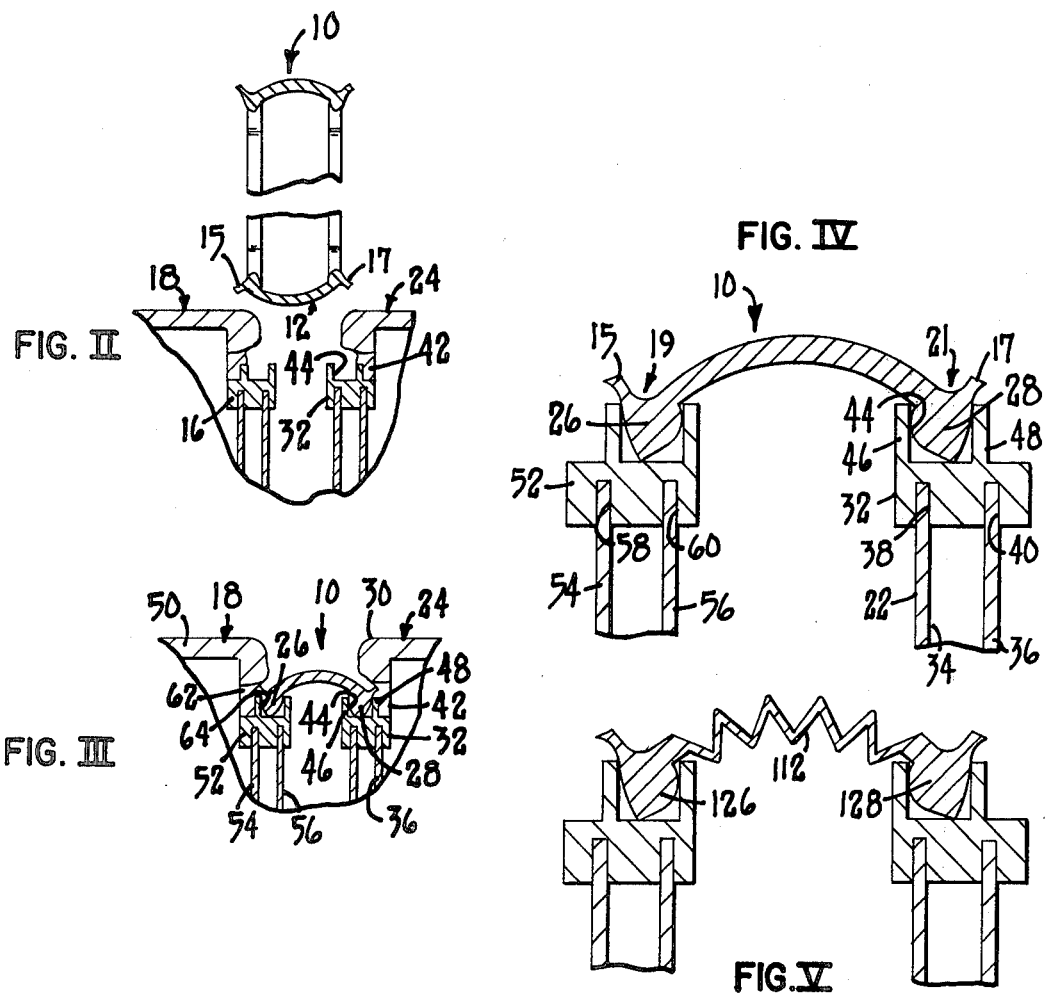

WINDOW BOOT

BACKGROUND OF THE INVENTION

This is a Continuation-In-Part Application of copending U.S. Pat. Application Ser. No. 738,313, filed Nov. 2, 1976, entitled "WINDOW BOOT" now U.S. Pat. No. 4,114,943 issued Sept. 19, 1978.

The present invention relates generally to window boots, and more particularly to a boot of the type employed to provide an air corridor in the spacing between facing windows of a cab of a vehicle and, for instance, a recreational housing accessory mounted on the vehicle.

It is desirable to provide a connecting passage between the cab and camper in the conventional truck-camper combination, Heretofore, this generally has been achieved by removing the rear window pane from the cab of the truck and by removing the facing front window pane from the forward wall of the camper. The two window apertures have then been coupled by means of an open ended flexible boot. Such boot has extended into the respective window apertures both of the truck and the camper. The boot thus defines a passage therebetween.

It is undesirable to require removal of the window panes in the cab and camper for installation of the boot, even when the installed boot permits installation of the panes thereafter. For exmple, removal of the window panes is bothersome and may be time consuming. Accordingly, the instant invention provides a boot that may be installed in the frame runners of the respective windows, without removal of the windows. Of course, it is highly undesirable for leakage to occur between the boot and the window frame. The present invention provides a trough to assure removal of water, such as rain water, and avoid leakage.

SUMMARY OF THE INVENTION

Generally speaking, in accordance with the invention, a boot is provided which includes a resiliently deformable boot frame shaped to the respective contours of the rear window aperture of the truck cab and front window aperture in the forward wall of the camper. The opposite ends of the boot frame terminate in respective continuous thickened lips which snap-fit into or frictionally engage the corresponding channels provided in the cab and camper window frames.

The boot is mounted in the respective window frames without adhesives, nails, screws, bolts or the like. It is also not necessary to remove either window to make the installation. Both windows remain slidable in their frames after the installation. The boot is easily removed.

The present invention provides a novel boot assembly which is releasibly secured to the frames of the windows in the cab and camper.

The boot assembly for a cab/camper combination may be installed without removing the windows in either the cab or camper. The present boot assembly for a cab/camper permits operation of the windows without interference from the boot. Still other advantages of the invention will be apparent from the disclosure of the present invention.

BRIEF DESCRIPTION OF THE DRAWINGS

FIG. I is a perspective view of a truck cab and camper together with the boot constructed according to the instant invention;

FIG. II is a fragmentary detail view of the invention taken along line II—II of FIG. I;

FIG. III is a view similar to FIG. II, however with the boot installed;

FIG. IV is an enlarged view of a portion of FIG. III; and

FIG. V is a view of an alternate embodiment.

DETAILED DESCRIPTION OF THE INVENTION

Referring now to the drawings, the boot 10 constructed according to the instant invention generally comprises a resiliently deformable sidewall or web 12 which is continuous. The sidewall 12 defines an aperture 14 correspondingly registerable with a rear window 16 mounted in a cab 18 of the truck generally numbered 20, and a facing front window 22 mounted in the forward wall of a camper 24. The sidewall 12 terminates in a pair of opposite corresponding respectively continuous lips 26 and 28. The thickened lips 26 and 28 of boot 10 each further includes a flange-like projection 15 and 17, respectively. The projections 15 and 17 serve to seal the boot and the windows while providing a trough 19 and 21 for carrying water away. The boot 10 is releasibly mounted between cab 18 and camper 24 as hereinafter described in detail.

The cab 18 and the camper 24 are of conventional construction, and do not per se form a part of this invention. Mounted in the front facing of the camper housing 30 is a sash frame 32 for the window 22 which comprises first and second slidable panes 34 and 36, the panes 34 and 36 being slidable in adjacent runners 38 and 40 provided in frame 32. As best seen in FIGS. II and III, the frame 32 is secured to the camper housing by weather stripping 42. A U-shaped channel 44 is formed on the top surface of frame 32 by corresponding adjacent flanges 46 and 48 upstanding therefrom.

One end of the weather stripping 42 is secured to the camper housing 30 by conventional means, such as an adhesive. The frame flange 48 is fully embedded in the other end of weather stripping 42, whereby the frame 32 is fixedly secured to the housing 30. The weather stripping 42 is of substantially rigid construction and overhangs into channel 44, thereby providing a partial blockage therein.

As best seen in FIG. III, the lip 28 provided in sidewall 12 is snap-fit into the channel 44 for releasibly mounting the boot frame 10 on camper 30.

The rear window 16 in cab 18 is constructed, assembled and mounted in the cab housing 50, in a manner similar to that described with regard to window 22.

The rear window 16 of cab 18 includes a sash frame 52 which carries first and second slidable panes 54 and 56. The first and second panes 54 and 56 are slidable in adjacent runners 58 and 60 of frame 52. The frame 52 may be secured to the cab 18 by weather stripping 62. The lip 26 of boot 10 is snap-fit and frictionally held in channel 64.

The boot 10 may be mounted in place by inserting the boot 10 into the space between cab 18 and camper 24 and aligning the opening 14 with the windows 16 and 22. The lip 28 is pressed into channel 44 where it is frictionally held. The lip 26 in like manner is pressed into channel 64 where it is frictionally held. The positioning of lips 26 and 28 in channels 44 and 64 retain the projections 15 and 17 in a substantially upstanding position thereby providing troughs 19 and 21.

The boot 10 can be removed by reversing the procedure. In otherwords, one may reach into the window opening and push upwardly on the boot 10 thus forcing the lips 26 and 28 out of the channels 44 and 64. The boot may then be removed from between the cab 18 and camper 24.

An alternative embodiment of the present invention, boot 110, is illustrated in FIG. V. The boot 110 includes a sidewall or web 112 and a pair of thickened lips 126 and 128. The web 112 in this embodiment is of accordian construction which enables the boot to expand or contract to fit various spacing between cab and camper. In other words, in some instances, the space between the cab and camper may be greater and in other instances the spacing may be less. A single boot of the type shown in FIG. V will work in both cases. The boot 110 will also function satisfactorily in those instances where the spacing between the camper window and the cab window may be non-uniform, for example, spaced closer at the bottom and spaced greater at the top. Boot 110 is suitable for use where one window is higher than the other window.

While the boot may be fabricated of a number of different materials, rubber is a preferred material. It is a feature of the invention that the boot and mounting therefore do not inhibit window movement of either window. It is another feature of this invention that the boot is readily removable and replaceable.

Of course various changes may be made in the above constructions without departing from the spirit and scope of the present invention and it is intended that all matter contained in the above description or shown in the accompanying drawings shall be interpreted as illustrative and not in a limiting sense.

What is claimed:

1. A combination including a boot and frame windows or a cab/camper assembly of the type having a rear frame window in the cab and a corresponding front frame window in the forward wall of the camper, said boot comprising a boot frme including a continuous resiliently deformable side wall, said side wall defining an aperture corresponding respectively to said windows in said cab and said camper, said side wall terminating in respective opposite ends, said respective opposite ends each including a thickened resilient continuous lip, each of said lips being adapted to be snap-fit into a corresponding window frame for thereby mounting said boot between said cab and camper, each of said thickened lips including an outwardly extending flange-like projection, said projection cooperating with said side wall to define a water trough, each of said window frames including an exteriorly extending substantially U-shaped channel in which a respective lip of said boot is grippingly receivable whereby said boot may be easily mounted and dismounted.

2. The combination of claim 1 wherein the said wall of said boot frame comprises an arcuate web, and wherein said flange-like projection cooperates with said web to form a water trough.

3. The combination of claim 1 wherein the side wall of said boot frame comprises an accordian-type wall and wherein said flange-like projection cooperates with a portion of said accordian-type wall to form a water trough.

4. A boot for use in conjunction with a pair of frame windows of a cab/camper assembly of the type having a rear frame window in the cab and a corresponding front frame window in the forward wall of the camper, said window frames each including channel means around the perimeter thereof, said boot comprising a tube-like web of resiliently deformable material and a pair of thickened resilient lips, said web terminating in respective opposite ends, one of said lips being integrally disposed at each end of said tube-like web, each of said lips being adapted to be snap-fit into the channel means of the adjacent window frame for thereby mounting said boot between said cab and camper, each of said lips including outwardly extending flange means which together with said tube-like web serve to define a water through for draining away rain water.

5. The boot of claim 4 wherein said tube-like web comprises an accordian-type wall structure.

6. A boot for use in conjunction with a pair of frame windows of a cab/camper assembly of the type having a rear frame window in the cab and a corresponding front frame window in the forward wall of the camper, said windows each including channel means around the perimeter of the window, said boot comprising:
   a tube-like web of resiliently deformable material, said web terminating in respective opposite ends, said web comprising an accordian-type wall structure; and
   a pair of thickened resilient lips, one of said lips being integral with each of said tube-like web ends, each of said lips being adapted for friction engagement in the channel means of the adjacent window frame for mounting said boot between said cab and camper, at least one of said lips including a projection which cooperates with said tube-like web to define a trough.

7. The boot of claim 6 wherein said lips each include a flange-like projection thereby providing seal flange means.

* * * * *